(12) United States Patent
Becker et al.

(10) Patent No.: US 6,338,771 B1
(45) Date of Patent: Jan. 15, 2002

(54) METHOD AND DEVICE FOR REMOVING LAMINATION

(75) Inventors: Ernst Becker, Berglen; Wolfgang Wächter, Glaucha; Hans-Peter Gaibler, Korb; Hans-Peter Schommer, Miedelsbach, all of (DE)

(73) Assignee: Becker Preservotec GmbH, Winnenden (DE)

( * ) Notice: Subject to any disclaimer, the term of this patent is extended or adjusted under 35 U.S.C. 154(b) by 0 days.

(21) Appl. No.: 09/424,361

(22) PCT Filed: May 25, 1998

(86) PCT No.: PCT/EP98/03070

§ 371 Date: May 3, 2000

§ 102(e) Date: May 3, 2000

(87) PCT Pub. No.: WO98/52752

PCT Pub. Date: Nov. 26, 1998

(30) Foreign Application Priority Data

May 23, 1997 (DE) .......................... 197 21 704

(51) Int. Cl.[7] .............................................. B32B 35/00
(52) U.S. Cl. ........................................ 156/344; 156/584
(58) Field of Search ................................ 156/344, 584

(56) References Cited

U.S. PATENT DOCUMENTS 2,765,267 A   10/1956  Dorst
4,380,485 A * 4/1983  Schuster ...................... 156/254
4,392,889 A   7/1983  Grout
5,916,410 A * 6/1999  Goulet et al. ............... 156/344
6,136,121 A * 10/2000 Jones et al. .................. 156/94

FOREIGN PATENT DOCUMENTS

| DE | 251728     | 11/1987 |           |
|----|-----------|---------|-----------|
| DE | 4105368 C1 | 2/1991  |           |
| DE | 19510959 A1 | 3/1995 |           |
| GB | 1445 168   | 8/1976  |           |
| JP | 63-202409  | * 8/1988 | ............... 156/344 |
| JP | 05220747   | 8/1993  |           |
| JP | 09059423   | 4/1997  |           |
| WO | WO 97/16312 | 5/1997 |           |

* cited by examiner

Primary Examiner—Mark A. Osele
(74) Attorney, Agent, or Firm—Crowell & Moring LLP

(57) ABSTRACT

In a process and an apparatus for detaching a lining of thin composite material from a central region, the detachment operation is effected in a continuous procedure with the composite material in the form of an endless web. The composite material passes as a treatment region successively through an initial dissolution region and a deactivation region, in each of which inter alia moisture is fed to the composite material. The residence times in those regions are controllable independently of each other and at least at the end of those regions a respective operation for the preliminary removal of moisture from the composite material is effected. After the last region the composite material is subjected to a drying operation and the lining is detached from the central material by their being moved away from each other.

22 Claims, 2 Drawing Sheets

METHOD AND DEVICE FOR REMOVING LAMINATION

BACKGROUND AND SUMMARY OF THE INVENTION

The invention concerns a process and an apparatus for detaching a thin composite material from a central region. In that respect the central region may be in particular a paper or a material comprising a plurality of layers using paper.

This is the case in particular in regard to the restoration of books, manuscripts, notes, magazines and journals, loose-leaf collections, file records and the like, in which the original sheets or leaves are made good by repairing flaws and introducing a core layer.

That results in a composite material comprising a central core layer, to which the original halves of the leaf or format or page of the book, having been separated along the central plane, are glued on both sides by means of a core adhesive, while applied in turn to the above-mentioned halves on the outsides thereof by means of a lining adhesive is a respective lining or laminating backing which serves in particular for the handling procedure in the preceding working steps.

As the last processing stage, the lining on the two sides now has to be removed again in order to regain the original page which has been supplemented by the core layer.

In this respect the composite material generally occurs in the form of substantially endless webs or strips which are wound on to large winding drums, referred to as reels, with the individual pages of the book being disposed on the composite material in part in a multiple configuration in mutually juxtaposed relationship and one behind the other, arranged to constitute what are referred to as formats.

Detachment of the lining is effected by dissolving the above-mentioned lining adhesive, mostly gelatin, by the action of enzymes at an optimum operative temperature. Theoretically, detachment would also be possible only by long-term action of moisture or water, and possibly elevated temperature, which however would result in such a long period of action that treatment in a continuous-operation procedure is difficult. However it is only a continuous treatment procedure that makes it possible overall to achieve low restoration costs.

Therefore the object of the present invention is to provide a process and an apparatus for carrying it into effect, with which rapid and inexpensive detachment of the linings from the central material is possible, while the detachment result can be easily influenced and controlled.

By virtue of the fact that detachment of the lining is implemented in a continuous procedure, on the one hand the efficiency of the process can be increased and on the other hand it is possible to involve control and regulating procedures which are not possible in a single-sheet treatment or batch-wise treatment, as the previous settings in respect of the previous item or the previous batch are no longer available when dealing with the next one.

In order to be able to operate in a continuous procedure, the composite material to be treated is supplied either by being unwound from a delivery reel on which the composite material is wound or directly from the preceding processing unit which first produces the lining composite.

Because of the long path of movement through the present machine, in batch treatment, that is to say when feeding the composite material to be treated from a delivery reel, operation is not effected directly with the beginning of the composite material when starting up the batch treatment. On the contrary, firstly, generally by hand, a flexible pulling or draw band which consists of rubber is pulled in through the machine until the leading end has reached the last drawing or pulling feed rollers near the cutting station. The trailing end of the pulling or draw band is connected to the leading end of the composite material on the delivery reel, for example by a clip fastener involving force-locking engagement.

In that respect, the pulling or draw band is generally somewhat thicker than the composite material to be treated and in particular the pulling or draw band is somewhat wider than the composite material. Shoulders are provided on the direction-changing rollers or pressing rollers at the sides thereof, the internal spacing of the shoulders being only slightly greater than or of the same magnitude as the width of the pulling or draw band. The pulling or draw band is therefore guided in positively engaged relationship in the transverse direction by those shoulders which are present at least in relation to some of the drums or rollers. That already ensures that the pulling or draw band is introduced straight, and the composite material joined thereto is also thereby already roughly aligned. Fine alignment is effected by additional control means which are described hereinafter, but in general the composite material should never reach the further outwardly disposed contact or abutment shoulders on the drums or rollers for the pulling or draw band.

After the machine has started up, the pulling or draw band is removed from the beginning or leading end of the composite material and, when the composite material delivery bobbin is coming to the end, it is joined again to the end of the composite material. The composite material itself thereby again pulls the pulling or draw band through the machine so that it can be left in that position and can thus be used as the leader band for introducing the next length of composite material from the next delivery bobbin. That means that it is only necessary to thread the material into the machine by hand on a single occasion when the machine is first started.

The water from the treatment units is also preferably circulated. In particular it is passed in the dip or immersion tanks or containers in counter-flow relationship with respect to the direction of travel of the composite material to be treated, the above-mentioned direction of flow being achieved by stepped overflows from the rearmost to the foremost dip or immersion tanks.

The water which evaporates out of the immersion tanks or containers is preferably condensed and returned to the water circuit.

The composite material in web form successively passes through preferably a plurality of treatment steps, for example an initial dissolution region, a deactivation region and possibly a rinsing region, in each of which inter alia moisture is supplied to the composite material. The residence times in those individual regions are preferably controllable independently of each other so that in the event of poor detachment or premature detachment of the lining the period of action of the individual dissolution or treatment agents on the composite material can be suitably adjusted.

At the end of each of those regions, the procedure preferably involves an operation for rough or preliminary removal of moisture from the composite material in order to expel the moisture which is absorbed in the composite material and for the major part to prevent the individual agents from passing across into the next following treatment region. After the last treatment step the composite material is finally dried and the lining released from the central material by moving them apart.

In that respect, for carefully detaching the lining from pages of a book which are often very valuable, it is important to be able to accurately adjust the residence time of the composite material in the individual treatment regions. A simple option in that respect is to vary the transit or passage distance of the composite material in strip form which is moved at a uniform speed, so that the residence time in the individual regions is also altered.

In regard to the treatment, attention is to be paid in particular to the physical and chemical properties of the lining adhesives used, in comparison with the core adhesive, by means of which the central material, for example the separated halves of a page of a book, are glued on the core material. The core adhesive is not to lose its adhesion under the physical or chemical conditions under which the lining adhesive loses adhesion, as otherwise the central material disintegrates again.

The treatment region preferably includes an initial dissolution region, a deactivation region and a rinsing region, which is not required under all circumstances, with the composite material in web form passing through those regions in the stated sequence.

In the initial dissolution region the composite material is subjected to the action of or is dipped into an aqueous solution which contains between 1 and 5%, in particular 2% enzymes, which is at a temperature of between 50 and 65° C., in particular 60° C.

In the deactivation region the composite material is heated to at least 70° C., in particular to between 70 and 80° C., by a procedure whereby it is brought into contact with a suitably temperature-controlled aqueous solution, in particular the aqueous solution of the initial dissolution region.

In the rinsing region the composite material is rinsed clear with water or vapour or steam which does not contain any enzymes.

A particularly intensive and therefore rapid treatment is carried out on the composite material if it passes through fluid-filled dip or immersion regions, in which case for example the initial dissolution region or the deactivation region or the rinsing region respectively can be formed separately as fluid-dip or immersion regions.

Another effective alternative procedure would involve for example acting on the composite material by means of steam or vapour in the respective treatment regions which are each equipped with steam or vapour discharge or spray nozzles, as an alternative to the dipping procedure.

In order to achieve long residence times and correspondingly intensive treatment for the composite material in the individual treatment regions, the composite material in web form can pass a plurality of times through an individual region in a wound or loop-like configuration, with direction-changing rollers over which the web passes being disposed within the tanks or containers.

A similarly intensive treatment is achieved if the individual regions are each of a multi-stage nature, that is to say, provided within each region are spaces or chambers which are separated from each other and in which the composite material is subjected to treatment. Treatment of the composite material is then effected two or more times in succession and can be carried out either with the same operating procedures, for example involving spraying, or using different operating procedures, for example vapour or steam treatment and dipping.

Between the individual chambers or spaces of a treatment region, the composite material is preferably subjected to a mechanical operation for the rough or preliminary removal of moisture therefrom, by the composite material being passed between two rollers which expel excessive fluid. Those pressing rollers are preferably arranged immediately after the exit of the web, above each space or chamber, so that the expelled fluid can run back or drip into the respective space or chamber. The fact that the moisture is expelled from the composite material before it passes into the next following space or chamber on the one hand for the major part prevents mixing of the treatment agents while on the other hand it affords uniform penetration of moisture through the composite material.

After the last treatment step the entire composite material passes into a drying section. Drying of the composite material can be effected in a single-stage procedure, for example by contact drying, or for example in a multi-stage procedure, being divided up in particular into a preliminary drying operation and a main drying operation. In the preliminary drying operation moisture can be sucked out of the composite material by means of an absorbent dry material such as for example fleece or non-woven material.

The composite material then also passes horizontally into a drying box having a substantially closed housing through which dry air flows. The air can possibly be heated before flowing into the drying box.

These surfaces are preferably of such a shape and arrangement that a curvature of the composite material is effected around an axis of curvature transversely with respect to the direction of travel of the composite material. The dry air which flows through the drying box absorbs moisture as it flows past the composite material and transports the moisture out of the drying box.

It is only after leaving the drying box that the composite material preferably passes into a pull-off station in which the lining is detached from the central material. The lining and the central material are preferably guided away from each other by diverting the lining around two detachment rollers operating in opposite relationship, in a diametral direction. The linings from the top side and the underside are then wound on to separate lining reels which are disposed above and beneath the composite material web.

Preferably, detachment of the two linings which are disposed on the outward sides of the central material takes place simultaneously, that is to say at the same location at which the material passes through the machine, by the linings being moved away from each other in diametral directions and by the central material being continued in its movement in the direction of travel through the machine.

Downstream of the pull-off station, the remaining central material passes into a cutting station in which the formats which are in part multiply arranged in mutually juxtaposed relationship and one after the other are cut again to their original size.

For the purposes of accurate longitudinal alignment there can be provided for example a control or regulating means which checks with optical means whether for example a format is or is not under the cutting member and which suitably controls the conveyor rollers and the cutting blade.

The surest method of cutting the material to size is a process in which only sheets of a given size are cut from the web of central material and the individual pages of the book are then cut to size by hand. In production of the formats, the pages are therefore only arranged on predetermined regions so that a lateral edge portion remains free, which can be reliably cut by machine.

The transverse displacement is preferably detected by reference to the spacing of the composite web from a perpendicular central wall, and regulated if required.

The reels, like all other structural units which extend over the width of the composite web, are mounted only at one side, that is to say in freely cantilevered relationship on the perpendicular central wall which forms the machine frame structure. It is along that central wall that the composite material web is guided horizontally, treated, dried and finally cut again. In that respect, the straightness of the movement of the web is monitored by means of one or more sensors which sense the lateral edge of the composite web and measure the spacing of the edge relative to the central wall.

Provided in the course of the path of movement, in particular at the beginning and the end, are direction-changing rollers which are slightly pivotable independently of each other about a pivot axis which is perpendicular to the axis of rotation of the direction-changing rollers and which is approximately in the direction of travel of the web. In that way, it is possible to adjust the direction of travel, that is to say the straight-ahead movement, of the web passing thereover, in which respect the angle of wrapping of the web around the rollers should be at least 90°.

In order to achieve accurate transverse alignment, the rollers of the pull-off and cutting stations can also be regulatable at their axis of rotation. In addition the delivery reel on which the composite material is wound is variable in terms of its spacing relative to the central wall and is regulatable by means of a signal from the spacing sensors.

The apparatus according to the invention for the detachment of the lining of a thin composite material from a central material preferably includes a dip or immersion region comprising successively connected dip or immersion tanks or containers, a main drying means with heated curved heating surfaces and a pull-off station with an oppositely acting pair of detachment rollers at which the linings are separated from the central material and moved away from each other. These working stations are preferably arranged in direct succession.

Optionally, also disposed upstream of the main drying means is a preliminary drying means with a pair of pressing rollers which brings the composite material into contact under pressure with an absorbent material.

Disposed upstream of the dip or immersion region is a delivery reel on which the composite material is wound.

The residence time of the composite material in the individual tanks or containers of the dip or immersion region can be adjusted by displacement of dip or immersion rollers which can be vertically lowered and raised within the dip containers. The dip rollers are guided vertically along dip arms and are displaceable into the dip containers. The composite material in web form passes over the underside of the dip rollers and over the top side of direction-changing rollers which are arranged above and outside the dip containers.

Each treatment region preferably comprises a plurality of successively connected, in particular two respective dip containers, into each of which a dip roller can be moved. The depth of dip engagement of each dip roller along the dip arm is variable separately for each dip container.

The dip region is substantially sealingly enclosed by a dip or immersion housing in order to prevent solvents and the like from running out. The dip housing however has a dip region suction removal means for suction removal of the vapors occurring in the dip or immersion region, being arranged in the upper region thereof.

The individual dip containers are also in particular electrically heatable and are regulatable separately in respect of their temperature. Provided above each dip container is a direction-changing roller and a pressing roller which co-operates therewith, for expelling fluid from the composite material which passes through between them. The rollers are arranged in such a way that the expelled fluid flows back into the respective dip container.

A particularly intensive and efficient treatment of the composite material is achieved if vapor discharge nozzles which are directed towards the composite material are disposed within the dip containers. The vapor discharge nozzles can be arranged for example in the dip arms for the dip rollers.

After the last treatment step the composite web passes into a drying section. If necessary, at a preliminary drying station the composite material is passed through between a pair of pressing rollers, wherein an absorbent material such as for example an absorbent fleece or non-woven material belt or band is guided over each of the pressing rollers.

The pressing rollers do not necessarily have to be driven. The absorbent material is then entrained by the forward feed movement of the composite web between the rollers. When a relatively high level of pressing force on the part of the rollers is involved however it is advantageous to drive at least one pressing roller in order to prevent premature detachment of the lining.

At a location remote from the pressing rollers, the moisture contained in the endlessly circulating fleece or non-woven material belts is preferably acted upon by a moisture suction removal procedure or the moisture is blown out.

The main drying operation or the subsequent main drying operation is effected in a substantially closed main drying box through which drying air flows. The dry air, in particular pre-dried air, passes by way of a main drying inlet into the drying box and leaves it after passing along the composite web and receiving moisture by way of a main drying suction removal procedure.

The main drying station includes in the direction of movement through the apparatus a plurality of successively arranged curved heating surfaces, the temperature of which is separately controllable. The curved heating surfaces are arranged in opposite relationship to each other, with outwardly pointing apex points, so that the composite material which passes over the respective outside surfaces thereof is guided in a corrugated path of movement.

Arranged upstream of the first heating surface and downstream of the last heating surface, that is to say at the beginning and the end of the main drying box, are respective direction-changing rollers.

At least one pair of drive rollers, between which the composite material is passed, is arranged within the main drying box, preferably approximately at the middle of the length of the path of movement of the material through the apparatus. The heating surfaces are curved in particular about axes of curvature which are disposed transversely with respect to the direction of movement of the material through the apparatus and in particular they are arranged alternately above and below the main direction of travel of the material so that the composite material is guided in a corrugated path of movement.

The composite web leaves the main drying box preferably in a horizontal direction and thereafter passes into the guide rollers of the pull-off station. The guide rollers guide the composite web preferably precisely horizontally between the detachment rollers, in particular in such a way that the angle of introduction of the web with respect to the one roller is equal to the angle of introduction of the web with respect to the other roller. The detachment rollers are of a diameter of between about 80 and 150 mm, in particular between 90 and 110 mm.

Connected downstream of the draw-off station is a cutting station for cutting the central material in web form into individual sheets. Disposed between the detachment station and the cutting station is a loop-forming assembly comprising a first pair of loop rollers and a second pair of loop rollers which are driven separately so that stopping the second pair which is downstream in the direction of travel of the material and further driving of the first pair of loop rollers, causes the formation between the pairs of an increasing loop of central material. While that is happening the central material is stationary at the downstream-disposed cutting station and can there be cut to form sheets.

Arranged downstream of the cutting station is a conveyor belt for the individual sheets and an obliquely downwardly inclined delivery or stacking table.

For regulation of the transverse movement of the composite web, the delivery bobbin is mounted with its tube on a clamping core which is supported at one end in the central wall and which in particular is displaceable relative thereto in its axial direction.

In addition in regard to the apparatus according to the invention consideration should be given to the following details individually and/or in respect of the co-operation thereof:

- effected prior to the main drying operation is a preliminary drying operation with a pair of pressing rollers which brings the composite material into contact under pressure with an absorbent material;
- arranged upstream of the dip region is a delivery bobbin on which the composite material is wound;
- each dip container or tank comprises a plurality of successively connected and in particular two respective dip tanks or containers, and a dip roller is movable in each individual dip container;
- the depth of dip engagement of each dip roller along the dip arm is separately variable;
- all dip arms are fixed to a common support frame and the support frame is overall displaceable in such a way that all dip rollers are jointly removable from their dip containers;
- the dip region is substantially sealingly enclosed by a dip housing;
- arranged on the dip housing is a dip region suction removal means for suction removal of the vapors occurring in the dip region, being disposed in the upper region;
- the individual dip containers are heatable, in particular electrically heatable, and can be separately regulated in terms of their temperature;
- at least at the direction-changing roller disposed at the end of each dip container is a pressing roller which co-operates therewith for expelling fluid from the composite material which passes between them, whereby the expelled fluid flows back into the respective dip container;
- vapor discharge nozzles directed towards the composite material are disposed in the dip containers;
- vapor discharge nozzles are arranged in the dip arms for the dip rollers:
- at least one of the pressing rollers is driven;
- the endless circulating fleece or non-woven material belts or bands, at a location remote from the pressing rollers, is acted upon by a moisture suction removal means or the moisture is blown out, in order to remove the moisture contained in the belts or bands;
- the main drying operation is effected in a substantially closed main drying box which has a main drying suction removal means for the moisture-laden air and a main drying inlet for the introduction of dry air, in particular dried air;
- the main drying means has in the direction of travel of the material in succession a plurality of curved heating surfaces which are separately controllable in respect of their temperature and which are so arranged relative to each other that the composite material is guided over their respective outside surfaces;
- a respective direction-changing roller is disposed upstream of the first heating surface and downstream of the last heating surface;
- arranged within the main drying box, preferably approximately at the center of the travel length thereof, is at least one pair of drive rollers, between which the composite material is passed;
- the heating surfaces are curved about axes of curvature which are disposed transversely with respect to the direction of travel of the machine and which in particular are disposed alternately above and below the main direction of travel through the main drying means;
- the detachment rollers are of a diameter of between 80 and 150 mm, in particular between 90 and 110 mm;
- connected downstream of the pull-off station is a cutting station for cutting the central material in web form into individual sheets;
- arranged between the detachment station and the cutting station is a loop-forming assembly comprising a first pair of loop rollers and a second pair of loop rollers which are driven separately so that stopping the second pair of loop rollers and continuing to drive the first pair of loop rollers causes the formation therebetween of an increasing loop of central material while the downstream-disposed cutting station can cut the stationary central material; and
- arranged downstream of the cutting station are a conveyor belt for the individual sheets and an inclinedly downwardly directed sheet deposit or stacking unit.

An embodiment according to the invention will be described in greater detail hereinafter with reference to FIGS. 1 and 1b.

DETAILED DESCRIPTION OF THE INVENTION

Figure 1:
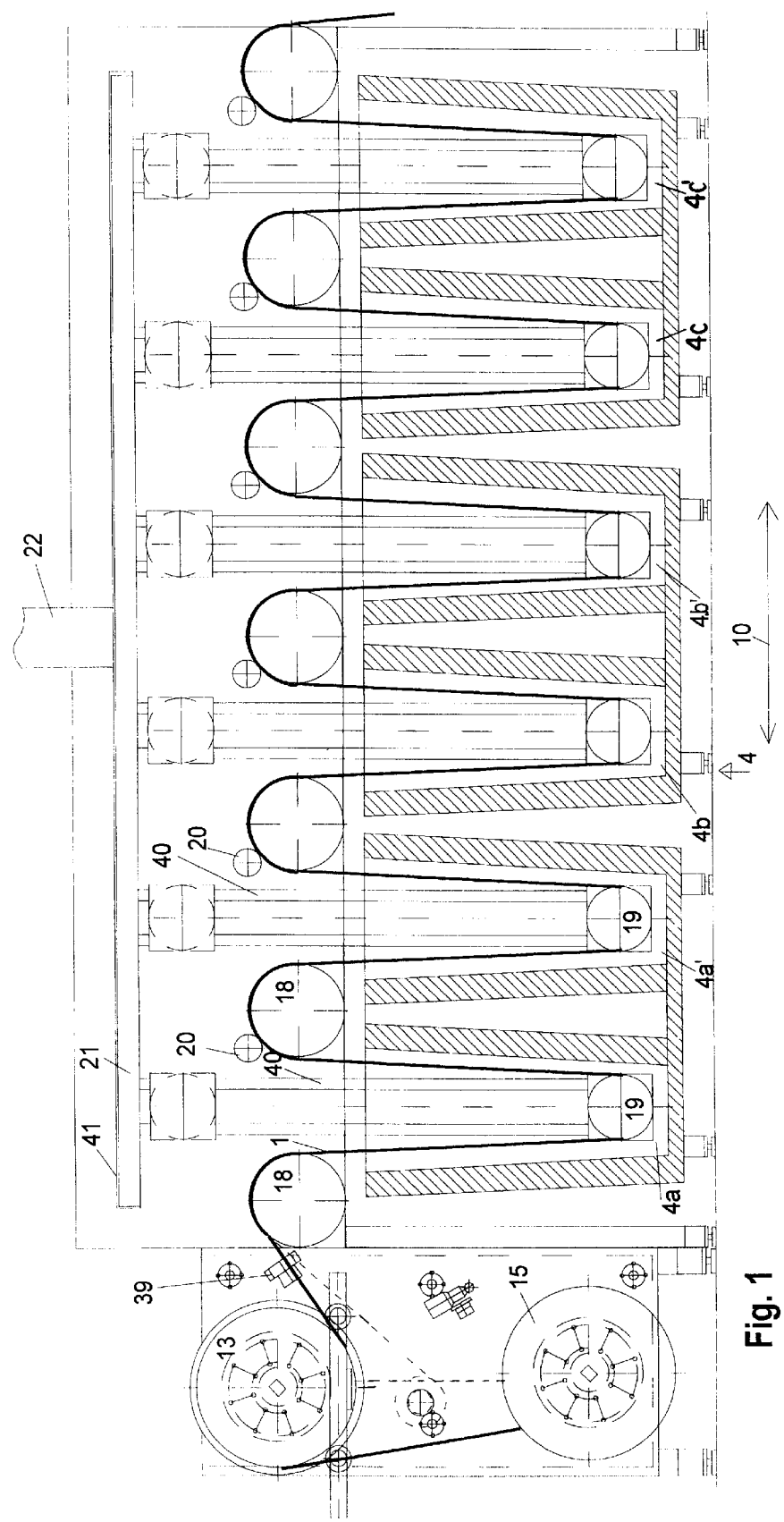
FIG. 1 is a front view of the apparatus.
Figure 1B:
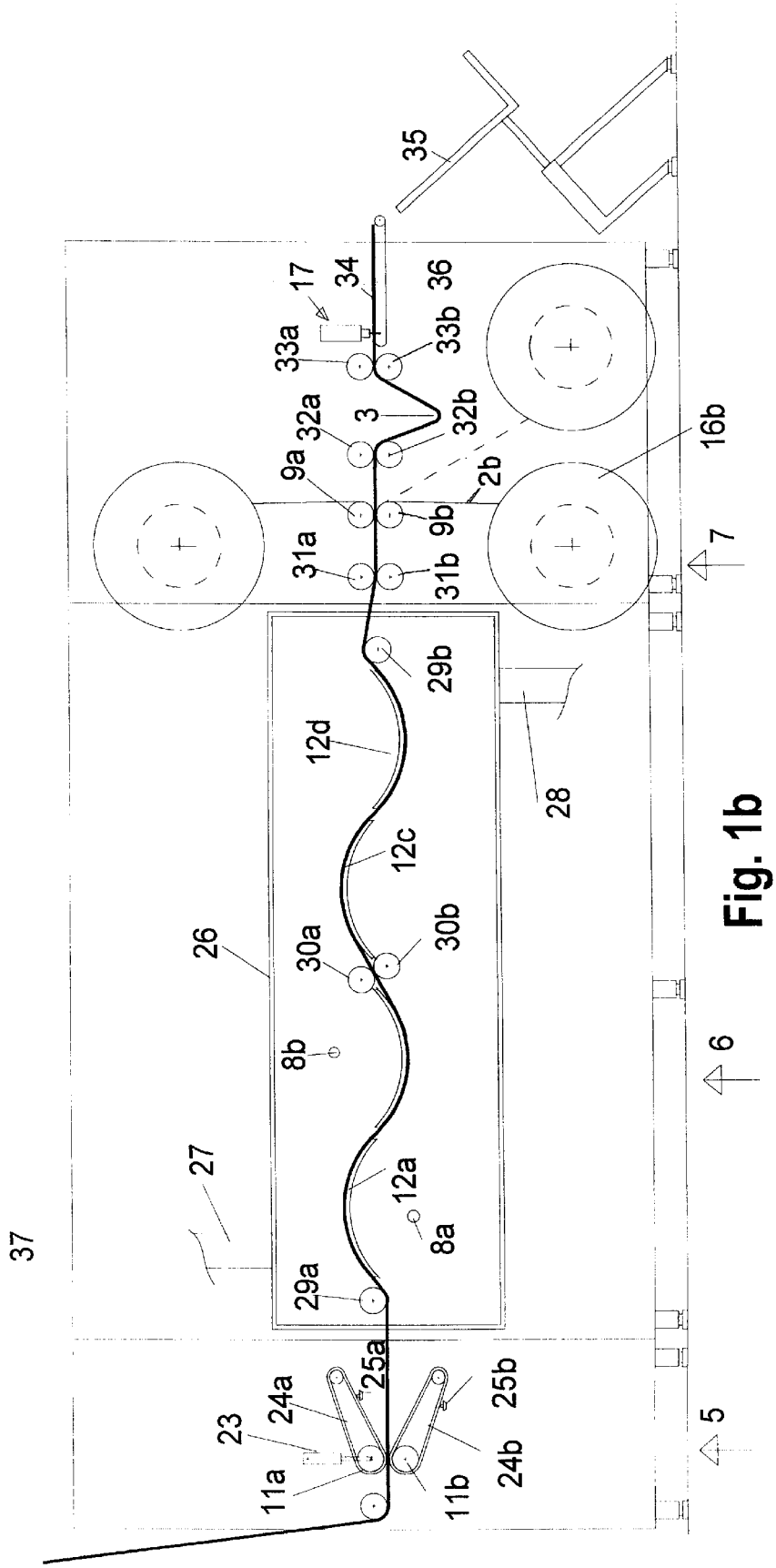
FIG. 1b is a view of a part of FIG. 1 on a different scale.

Referring to the Figures, shown therein is a front view of the machine in which, from left to right in the direction of travel of the material through the machine, the composite web 1 to be processed is unwound from a delivery reel 13 and passed by way of an upper direction-changing roller 18 into a dip or immersion region 4. Arranged downstream of the dip region 4 is a drying section comprising a preliminary drying means 5 and a main drying means 6 in which the composite material 1 is dried. The actual operation of pulling the lining 2 off the central material 3 is then effected at a pull off station 7. Finally, at a downstream-disposed cutting station 17, the central material 3 from which the lining 2a, 2b has been removed is cut into sheets and deposited on a sheet deposit or stacking unit 35.

The entire path of movement of the composite web can be clearly seen in this respect in the front view as all reels, direction-changing rollers and pressing rollers are supported at one end, only on their rear end that is remote from the person looking at the drawing, on the perpendicularly disposed central wall 37, so that they are in a forwardly freely cantilevered relationship. That means that the path of movement of the web can be readily viewed by the operator and it is also possible at any time to clearly view changes which are implemented by adjustments at the machine.

Arranged upstream of the dip region 4 is firstly a delivery reel 13 on which the composite material 1 is wound. The composite material 1 is unwound from the delivery reel 13 and the intermediate layer which is also wound on to the reel is wound on to an intermediate layer reel 15 disposed therebeneath.

The composite web 1 is drawn off the delivery reel 13 which is permanently braked by a coupling, and passes by way of an upper direction-changing roller 18 into the first tank or container 4a of the initial dissolution region. The processing region 4 is divided into an initial dissolution region, a deactivation region and a rinsing region, which are in the form of separate, fluid-filled dip or immersion regions. The initial dissolution region, the deactivation region and the rinsing region are each in turn subdivided into two mutually separate dip or immersion tanks or containers 4a, 4a', 4b, 4b', 4c, 4c'. Arranged in each dip container 4a, 4a', 4b, 4b', 4c, 4c' are dip or immersion rollers 19 for dipping in the composite material 1, which rollers 19 can be vertically lowered along dip arms 40 into the dip containers 4a, 4b, 4c. The composite material 1 in web form passes around the underside of the dip rollers 19 and over the top side of the direction-changing rollers 18 which are arranged above and outside the dip containers 4a, 4b, 4c.

A dip roller 19 can be displaced into each of the dip containers, and the depth of dip engagement of the roller 19 along the dip arm 40 is separately variable.

The dip region 4 is substantially sealingly enclosed by a dip housing 41 on which is arranged a dip region suction removal means 22, in the upper region thereof, for suction removal of the vapors which occur in the dip region.

The individual dip containers 4a, 4a', 4b, 4b', 4c, 4c' are for example electrically heatable and can be separately regulated in respect of their temperature. Arranged above and between the respective dip containers are a direction-changing roller 18 and a pressing roller 20 which cooperates therewith. The pressing roller 20 presses the fluid out of the composite material 1 which is passing through between the rollers so that the expelled fluid flows back into the respective dip container 4a, 4b, 4c. That prevents the individual fluids from excessively rapidly mixing together.

Arranged in the dip containers 4a, 4b, 4c are respective steam or vapor discharge nozzles (not shown) which are disposed on the dip arms 40 for the dip rollers 19.

In the initial dissolution region the composite material 1 is brought into contact with an aqueous solution which contains 2% of enzymes, at a temperature of 60° C. In the subsequent deactivation region the composite material 1 is dipped into the same aqueous solution as the initial dissolution region, at a temperature of 80° C. In the rinsing region, the composite material 1 is finally rinsed clear with water or steam or vapor which does not contain any enzymes.

After the last treatment step, namely rinsing in the container 4c', the composite web is once again passed between a direction-changing roller 18 and a pressing roller 20 and preferably horizontally passed in the travel direction 10 over a further direction-changing roller to the preliminary drying station 5.

The preliminary drying means 5 operates using the procedure of contact drying and includes a pair of pressing rollers 11a, 11b between which the composite material 1 is passed, an absorbent fleece or non-woven material belt 24a, 24b being passed over each of the pressing rollers 11a, 11b. The pressing roller 11a is driven by a motor at the speed of the composite web 1.

This arrangement ensures that not too much friction occurs between the pressing rollers 11a, 11b and the lining 2 of the composite material, and the lining 2 is not prematurely detached from the composite material 1.

The endlessly circulating fleece or non-woven material belts 24a, 24b, at a location remote from the pressing rollers 11a, 11b, at the underside of the vertically circulating belts 24a, 24b, are subjected to the action of a moisture suction removal means 25a, 25b, whereby the major part of the moisture received by the belts 24a, 24b is removed.

The fleece or non-woven material belt units which are arranged above and below the horizontally moving composite web 1 are oriented inclinedly towards each other, wherein the pressing rollers 11a, 11b which are arranged vertically one above the other press against each other indirectly by way of the composite material 1. The fleece or non-woven material belt units are mounted pivotably and the upper pressing roller 11a is pressed indirectly against the lower pressing roller 11b by means of a pressing ram 23.

After the preliminary drying operation at 5, the composite web 1 continues to pass horizontally into a substantially closed main drying box 26 which has a main drying suction removal means 27 for the moisture-laden air and a main drying inlet 28 by way of which in particular dried air passes into the main drying box 26.

In addition, arranged in succession in the travel direction 10 in the main drying box are a plurality of curved heating surfaces 12a, 12b, 12c which can be heated independently of each other. The composite material 1 passes over the outward sides of the curved heating surfaces 12a, 12b, 12c, . . . , which are curved around axes of curvature 8a, 8b, and are disposed transversely with respect to the travel direction 10 alternately above and below the main direction of travel of the material through the main drying assembly 6 so that the composite material is curved twice at least in each direction of curvature.

A respective direction-changing roller 29a, 29b is arranged upstream of the first heating surface 12a and downstream of the last heating surface 12d. Arranged approximately at the center of the main drying box 26 between the heating surfaces 12b and 12c is a pair of drive rollers 30a, 30b, between which the composite material 1 is passed.

So that the composite web 1 does not deviate laterally from the direction 10 in which it travels through the apparatus, lateral control must be afforded in particular while the web is passing through the dip region 4 and the drying region 5 and 6. For that purpose the spacing of the edge of the composite web 1, which is closer to the central wall 37, is measured, and in the event of a deviation the angle of the direction-changing rollers 18 or the dip rollers 19 relative to the central wall 37 is slightly altered. The spacing of the edge of the composite web relative to the central wall 37 is detected in that case by lateral edge sensing devices 39, for suitable adjustment of the appropriate rollers or reels.

If a defective lateral spacing is detected for example in the region of the dip region 4, then for example the spacing of the delivery reel 13 which is displaceable in the axial direction, relative to the central wall 37, is regulated. In addition, the angle of the direction-changing rollers 18 and/or the dip rollers 19 relative to the central wall 37 is slightly variable. This alters the direction of travel of the composite material 1 in web form and thus represents the lateral control effect which is monitored by the lateral edge sensors 39.

If in contrast a defective lateral spacing is detected in the region of the drying section 5, 6, then one of the drive rollers 30a, 30b is at least slightly pivoted with respect to a pivot axis extending transversely with respect to the direction in which the rollers extend, in order thereby to be able to control lateral deflection or straight ahead movement of the composite web 1. For that purpose the corresponding drive roller 30a, 30b is supported in a pivot or self-aligning bearing as the drive roller, like all units of the corresponding apparatus, is fixed only at one end to a central wall and extends therefrom in freely cantilevered relationship.

For the purposes of lateral adjustment the downstream-disposed rollers 9a, 9b, 31a, 31b, 32a, 32b, 33a, and 33b can also be adjustable in respect of their angle relative to the central wall 37.

Connected downstream of the main drying station 6 is a pull-off station 7 and a cutting station 17 for cutting the central material 3 in web form into individual sheets.

In the pull-off station 7, the composite material 1 firstly passes through guide rollers 31a, 31b which align the composite material 1 so that it is guided for example horizontally between the subsequently disposed detachment rollers 9a, 9b.

The detachment rollers 9a, 9b are arranged relatively closely downstream of the guide rollers 31a, 31b so that the composite material 1 is guided straight, that is to say, no bend occurs in the path of movement between the pairs of rollers, and thus the linings 2a and 2b at the top side and the underside of the composite material can be uniformly simultaneously pulled off.

Disposed between the detachment station 7 and the cutting station 17 is a loop-forming assembly comprising a first pair of loop rollers 32a, 32b and a second pair of loop rollers 33a, 33b which are driven separately. Stopping the second pair of loop rollers 33a, 33b, while continuing the drive to the first pair of loop rollers 32a, 32b, causes the formation therebetween of an increasing loop of central material 3 while the downstream-disposed cutting station 13 can cut the stopped central material 3. After the stoppage, the pair of loop rollers 33a, 33b are driven forwardly by precisely one sheet length, before the sheet is cut off by the cutting blade 34 of the cutting station 17.

The linings 2a, 2b are detached from the central material 3 at the detachment rollers 9a, 9b and moved away from each other in an upward and a downward direction respectively, in each case through a 90° angle. The upper and lower linings 2a, 2b are then wound on to a lining reel 16a, 16b arranged above and below the composite web 1 respectively. Connected downstream of the cutting station 17 is a conveyor belt for the individual sheets and an inclined sheet deposit table 35 on which the individual sheets are stacked.

What is claimed is:

1. A process for detaching the lining of a thin composite material from a central material,
wherein the detachment operation is effected in a continuous procedure whereby
the composite material is in the form of a substantially endless web,
the composite material passes as a treatment region successively through an initial dissolution region and a deactivation region in each of which moisture is fed to the composite material,
wherein the residence times in said individual regions are controllable independently of each other,
an operation for the preliminary removal of moisture from the composite material is effected at least at the end of each of those regions,
the composite material is subjected to a drying operation after the last of said regions, and
the lining is released from the central material by their being moved away from each other.

2. A process as set forth in claim 1, wherein the treatment region further has a rinsing region downstream of the initial dissolution region and the deactivation region.

3. A process as set forth in claim 1, wherein the initial dissolution region and the deactivation region are separately formed as fluid-filled dip regions.

4. A process as set forth in claim 1, wherein the initial dissolution region and the deactivation region are formed as regions which act on the composite material by means of steam.

5. A process as set forth in claim 1, wherein the treatment region further has a rinsing region downstream of the initial dissolution region and the deactivation region and the rinsing region is formed as a fluid-filled region.

6. A process as set forth in claim 1, wherein the treatment region further has a rinsing region downstream of the initial dissolution region and the deactivation region and the rinsing region is formed as a region which acts on the composite material by means of steam.

7. A process as set forth in claim 1, wherein the initial dissolution region and the deactivation region are each of a multi-stage configuration formed by spaces which are separate from each other within each region.

8. A process as set forth in claim 2, wherein the initial dissolution region, the deactivation region and the rinsing region are each of a multi-stage configuration formed by spaces which are separate from each other within each region.

9. A process as set forth in claim 1, wherein curvature of the composite material is effected at least in the region of the final drying operation.

10. A process as set forth in claim 9, wherein the curvature includes successively oppositely directed curvatures in different bending directions of the composite material.

11. A process as set forth in claim 9, wherein the curvature of the composite material is a curvature about an axis of curvature transversely with respect to the travel direction.

12. A process as set forth in claim 1, wherein the final drying operation is effected by convection on the basis of contact with heated, non-absorbent surfaces.

13. A process as set forth in claim 1, wherein when detaching first and second linings disposed on respective outward sides of the central material the detachment operation is effected simultaneously at the same location in the movement through the procedure by the linings being moved away from each other in diametral directions and by the central material being continued in its movement in the travel direction.

14. A process as set forth in claim 1, wherein in the initial dissolution region the composite material is brought into contact with an aqueous solution which contains between 1 and 5%, of enzymes, and is at a temperature of between 50 and 65° C.

15. A process as set forth in claim 14, wherein said solution contains about 2% of enzymes.

16. A process as set forth in claim 14, wherein said temperature is about 60° C.

17. A process as set forth in claim 1, wherein in the deactivation region the composite material is heated to at least 70° C.

18. A process as set forth in claim 17, wherein the composite material is between about 70 and 80° C.

19. A process as set forth in claim 17, wherein the composite material is heated by being brought into contact by means of suitably temperature-controlled aqueous solution.

20. A process as set forth in claim 19, wherein said solution is the aqueous solution of the initial dissolution region.

21. Apparatus for detaching the lining of a thin composite material from a central material, including the following components in succession in the travel direction through the apparatus a dip region comprising successively disposed dip containers, a main drying means with heated curved heating surfaces, and a pull-off station with a mutually oppositely acting pair of detachment rollers operable to move the lining on the one hand and the central material on the other hand away from each other.

22. Apparatus as set forth in claim 21 including in the dip region for dipping the composite material dip arms, dip rollers and means for displacing the dip rollers vertically along the dip arms into the dip containers, and direction-changing rollers arranged above and outside the dip containers, the composite material in web form being guided around the underside of the dip rollers and over the top side of the direction-changing rollers.

* * * * *